US007880904B2

(12) United States Patent
Stenzel et al.

(10) Patent No.: US 7,880,904 B2
(45) Date of Patent: Feb. 1, 2011

(54) IMAGE AND STACKING ORIENTATION COMPENSATING METHOD AND APPARATUS FOR MEDIA HAVING MARGINAL REGIONS WITH DIFFERENT THICKNESSES

(75) Inventors: James G. Stenzel, Rochester, NY (US); Vincent Berardi, Webster, NY (US); Edward P. Imes, Ontario, NY (US); Ronald Edsall, Fairport, NY (US); Warren Brady, Rochester, NY (US); Liam Cummings, Macedon, NY (US); Norman Vanas, Rochester, NY (US); Christopher Delano, North Chili, NY (US); Michael Cook, Waterloo, NY (US)

(73) Assignee: Xerox Corporation, Norwalk, CT (US)

( * ) Notice: Subject to any disclaimer, the term of this patent is extended or adjusted under 35 U.S.C. 154(b) by 1493 days.

(21) Appl. No.: 11/263,330

(22) Filed: Oct. 31, 2005

(65) Prior Publication Data

US 2007/0098475 A1 May 3, 2007

(51) Int. Cl.
*G06K 15/00* (2006.01)
*B65B 35/10* (2006.01)
*B65H 1/00* (2006.01)

(52) U.S. Cl. ...................... 358/1.12; 358/1.18; 358/1.5; 358/3.21; 400/624; 400/630; 271/145; 271/148; 414/788; 414/788.3

(58) Field of Classification Search ................. 358/1.1, 358/1.2, 1.9, 3.22, 3.23, 1.16–1.18, 537, 358/538, 448, 449, 452, 453; 399/16, 361, 399/367–371, 376, 388–391, 38–45; 101/2, 101/37–40.1
See application file for complete search history.

(56) References Cited

U.S. PATENT DOCUMENTS

| | | | | |
|---|---|---|---|---|
| 4,346,880 | A | 8/1982 | Roller et al. | |
| 4,364,702 | A * | 12/1982 | Coussot | 414/788.3 |
| 5,287,159 | A * | 2/1994 | Sakakibara | 399/86 |
| 5,364,087 | A | 11/1994 | Schieck et al. | |
| 5,669,040 | A * | 9/1997 | Hisatake | 399/83 |
| 6,137,967 | A * | 10/2000 | Laussermair et al. | 399/16 |
| 6,283,469 | B1 * | 9/2001 | Weber | 271/148 |
| 6,743,493 | B2 * | 6/2004 | Crum et al. | 428/42.2 |
| 7,006,240 | B1 * | 2/2006 | Mori | 358/1.13 |

(Continued)

OTHER PUBLICATIONS

*Xerox Docucard Tips: Tilatron*; Internet website pages, http://www.docucard.com, printed Apr. 29, 2005.

*Primary Examiner*—Twyler L Haskins
*Assistant Examiner*—Chad Dickerson
(74) *Attorney, Agent, or Firm*—Fay Sharpe LLP

(57) ABSTRACT

In accordance with one aspect of the present exemplary embodiment, a printing system comprises a media feeder that receives and stores asymmetrically thick media from an outside source and outputs such media to the printing system via a feed mechanism. A conveyer system transports the asymmetrically thick media from the media feeder utilizing at least one linear belt wherein a sensor is employed to determine the presence of the asymmetrically thick piece of stock. A controller coupled to the conveyer determines the location and orientation of an image on a piece of the asymmetrically thick stock. An imaging system receives the asymmetrically thick media from the conveyer system and places an image on the media in the proper location and orientation based at least in part on information from the controller.

19 Claims, 9 Drawing Sheets

U.S. PATENT DOCUMENTS

| | | | | |
|---|---|---|---|---|
| 7,277,670 | B2 * | 10/2007 | Yuasa | 399/401 |
| 7,411,602 | B2 * | 8/2008 | Stenzel et al. | 347/262 |
| 2003/0190169 | A1 * | 10/2003 | Shibaki | 399/21 |
| 2005/0169650 | A1 * | 8/2005 | Ito et al. | 399/45 |

* cited by examiner

IMAGE AND STACKING ORIENTATION COMPENSATING METHOD AND APPARATUS FOR MEDIA HAVING MARGINAL REGIONS WITH DIFFERENT THICKNESSES

CROSS REFERENCE TO RELATED PATENTS AND APPLICATIONS

The present application is related to U.S. patent application Ser. No. 11/214,911, filed Aug. 31, 2005 entitled System, Method, and Program for Stacking Multi-Thickness Sheets of Media and to U.S. patent application Ser. No. 11/214,915, filed Aug. 31, 2005 entitled System, Method, and Program for Alternating Sheets of Media the disclosures of which are incorporated herein by reference in their entirety.

BACKGROUND

The present application relates generally to marking machines for printing documents and the like onto sheets or other forms of media whose thickness varies between edges and, more particularly, to image and stacking orientation compensation methods and apparatus for use with media having marginal regions with different thicknesses such as, for example, DocuCard™ available from Xerox. The subject methods and apparatus are particularly well suited for use in commercial and office printing systems for marking copy sheets that have peelable labels or the like on one end thereof stacked in input and/or output trays whereby one marginal region of the stack will be thicker than the other marginal region. However, it is to be appreciated that the methods and apparatus described herein are applicable in a wide variety of other environments including, but not limited to, any marking or material handling system wherein orientation of the media relative to the system as it is processed therethrough is a significant parameter in the effectiveness thereof.

In a typical electrophotographic printing process, a photoconductive member is charged to a substantially uniform potential so as to sensitize the surface thereof. The charged portion of the photoconductive member is exposed to a light image of an original document being reproduced. Exposure of the charged photoconductive member selectively dissipates the charge thereon in the irradiated areas. This records an electrostatic latent image on the photoconductive member corresponding to the informational areas contained within the original document. After the electrostatic latent image is recorded on the photoconductive member, the latent image is developed by bringing a developer material into contact therewith. Generally, the developer material comprises toner particles adhering triboelectrically to carrier granules. The toner particles are attracted from the carrier granules to the latent image forming a toner powder image on the photoconductive member. The toner powder image is then transferred from the photoconductive member to a copy sheet. The toner particles are heated to permanently affix the powder image to the copy sheet.

In a high speed commercial printing machine of the foregoing type, large volumes of copy sheets are fed from storage to the transfer station of the printing machine where the toner powder image is transferred to the copy sheet. Frequently, the copy sheets are stored on a elevator type of sheet feeding tray. The tray is mounted on a frame and moves vertically from a sheet loading to a sheet feeding position. High capacity printing machines require large amounts of copy sheets. For example, a fully loaded tray may be loaded with several reams of paper with each ream containing approximately five hundred sheets. The sheet feeder advances successive uppermost copy sheets from the stack of copy sheets mounted on the tray.

Many conventional marking devices are configured to obtain optimized results with standard sizes of sheets of media such as, for example, letter sized media (8.5" by 11"), A4 media, executive sized media, A5 media, legal sized media, envelopes, and the like. Specifically, for example, the media storage, media transport, and marking functions of these conventional marking devices are designed around these common media sizes such that these sizes of media can be most efficiently used within the devices. Accordingly, special steps and/or user-assisted functions may be required for uniquely sized media.

Some types of combined media for use in these conventional marking devices incorporate a smaller, uniquely sized, sheet of media fixed to at least a portion of a larger, standard sized, sheet of media. These types of media enable marking on the smaller, uniquely sized, sheet of media while utilizing the efficiently stored and transported, standard sized, sheet of media as a vehicle through the marking device. As a result, fewer special steps and/or user-assisted functions are required for marking on the smaller, uniquely sized, sheet of media.

Conventional marking devices that are optimized for standard sized media are designed to begin marking on a leading portion of the sheet of media as it is transported through the device. As a result, the smaller, uniquely sized, sheet of media is frequently fixed to the leading edge of the larger, standard sized, sheet of media. This allows for marking to begin on the leading portion of the combined media.

The above-described, conventional combined media, as result of having a smaller sheet of media fixed to a leading portion (in the vicinity of the leading edge of the combined media) of the larger sheet of media has a thicker leading portion than trailing portion (in the vicinity of the trailing edge of the combined media). Thus, the leading portion has a thickness equivalent to the thickness of both the small sheet and the large sheet while the trailing portion has a thickness equal to only the large sheet.

As used herein the term “leading edge” is intended to describe the edge of a sheet of media that leads the sheet of media as it is transported through a marking device. Similarly, the term “trailing edge” is intended to describe the edge of a sheet of media that leads the sheet of media as it is transported through a marking device. Similarly, the term “trailing edge” is intended to describe the edge of a sheet of media that is opposite the leading edge and trails the sheet of media as it is transported through the marking device. As used herein, the terms “feeder” or “media feed mechanism” are intended to describe devices that feed unmarked media into a marking device. The terms “stacker” or “media stacking mechanism” are intended to describe devices that stack marked media after being marked by the marking device. It should be appreciated that the feeder and/or stacker may be included in the marking device or may be separate devices attached to the marking device.

One example of the above-described combined, multi-thickness, media is Xerox Corporation’s DocuCard® media. For ease of explanation, the following exemplary systems, method and, programs will be disclosed using DocuCard® type media as an example of combined, multi-thickness, media; however, it should be appreciated that the principles disclosed herein may be applied to any type of media with each sheet having at least two different thicknesses.

Conventional media feeding mechanisms are designed such that feeding reliability is generally maximized when the top of the media stack is level front to back and side to side.

Conventionally, however, the above-described combined, multi-thickness, media is packaged and loaded into the feeder of marking devices with each sheet having the same orientation. Because each sheet has a same orientation, the marking device may process each sheet in the same manner, thus simplifying the marking process. Due to the orientation of the sheets, the thicker portion of each sheet of the combined media is oriented above the thicker portion of the sheets below it and the thinner portion of each sheet of the combined media is oriented above the thinner portion of the sheets below it.

As a result, and as described in further detail below, when the combined multi-thickness media is stacked and loaded into a marking device, there exists a substantial difference in thickness between a leading edge portion of a stack corresponding to the thick portion of the media and a trailing edge of the stack corresponding to the thin portion of the media.

This difference in thickness in the stack of media may cause problems when feeding and transporting the media through the marking device. Because of an increasing angle of incidence of the lead edge of the sheets to the feed mechanism, tall stacks of the combined multi-thickness media may not feed at all (misfeed), or may feed two or more sheets of media simultaneously resulting in a jam.

Currently, in order to avoid jams or misfeeds in conventional general purpose marking devices, user must limit the number of sheets of multi-thickness media that are loaded into a media tray in order to reduce the overall thickness difference between a leading edge portion of the stack and the trailing edge portion of the stack.

Similarly, the performance of conventional media stackers is substantially degraded when the marked media being stacked is not uniformly flat. As media is stacked sheet by sheet in the stacker of the marking device, the top of the stack becomes increasingly unlevel until the slope is great enough that the down-slope gravitational pull on the sheet exceeds the friction between sheets, and the sheets start to slip off of the stack.

Currently, the stacker must be unloaded more frequently, at lower than maximum possible stack height in order to avoid sheets from falling off the stack.

Various approaches have been devised for leveling sheets. In one example, U.S. Pat. No. 4,942,435 discloses a leveling supporting means for use in an electrostatographic machine for supporting a stack of sheets that is adapted to be interposed between a tray and a stack of copy sheets when one marginal region of the stack has a greater thickness than the other marginal region. The supporting means includes means for fixedly supporting the other marginal region of the stack of sheets and means for resiliently supporting at least the one marginal region of the stack of sheets having the greater thickness.

U.S. Pat. No. 5,364,087 discloses a tilting tray for feeding and stacking specialized forms. A modular tray is insertable into a printing machine which is arranged to have a stack of copy sheets disposed thereon. When one marginal region of the stack of copy sheets has a greater thickness than the other marginal region, the sheets are supported such that at least the opposed marginal regions of the uppermost sheet of the stack of copy sheets are at substantially about the same level while that portion of a majority of the copy sheets with the thicker marginal regions is downwardly supported at an acute angle with respect to the surface of the uppermost copy sheet in the stack.

In view of at least the foregoing, it is beneficial to provide systems, methods, and programs that allow for a large number of sheets of combined multi-thickness media to be loaded in the feeder of a general purpose marking device and stacked in the stacker of a general purpose marking device, without substantial expense and hardware modification.

BRIEF DESCRIPTION

In accordance with one aspect of the present application, a printing system includes a media feeder adapted to feed asymmetrically thick media sheets from a stack, a sensor adapted to detect the presence of the asymmetrically thick sheet, a controller for determining a location and an orientation of an image to be placed on the asymmetrically thick sheet, and an image transfer system for receiving the sheets from a drive system and placing the properly oriented and placed image on the media.

In accordance with a further aspect of the present application, an orientation sensor detects the orientation of the copy sheet relative to the feed path in order to determine the proper orientation of the image on the sheet. In one embodiment, the server includes a machine vision system such as an optical vision system, for example, although any known or hereinafter developed sensor systems are useful as well.

In accordance with yet a further aspect of the application, a controller receives page counts from an associated operator, the page counts indicating a bundle of similarly oriented media having asymmetrical thickness and a controller is provided for selectively rotating the image relative to the paper path in accordance with the bundle count so that stacks of asymmetrical thickness copy sheets can be stacked in an input tray of the system in an alternating arrangement. In that way, overally stack buildup is avoided.

In accordance with yet a still further aspect of the present application, various exemplary implementations of the principles described herein provide a storage medium storing a set of program instructions executable on a data processing device and usable to adjust marking data for use with alternately stacked multi-thickness media. The instructions may include instructions for inputting marking data. The instructions may include instructions for determining an orientation of each sheet of multi-thickness media that is alternated within a stack. The instructions may include instructions for adjusting, for each sheet of multi-thickness media whose orientation is not consistent with the marking data, the marking data for that sheet of multi-thickness media such that the marking data for that sheet of multi-thickness media is consistent with the orientation of that sheet of multi-thickness media.

These and other aspects of the invention will become apparent to those of ordinary skill in the art upon reading and understanding the present application.

BRIEF DESCRIPTION OF THE DRAWINGS

Exemplary implementations will now be described with reference to the accompanying drawings, wherein.

DETAILED DESCRIPTION

Figure 1:
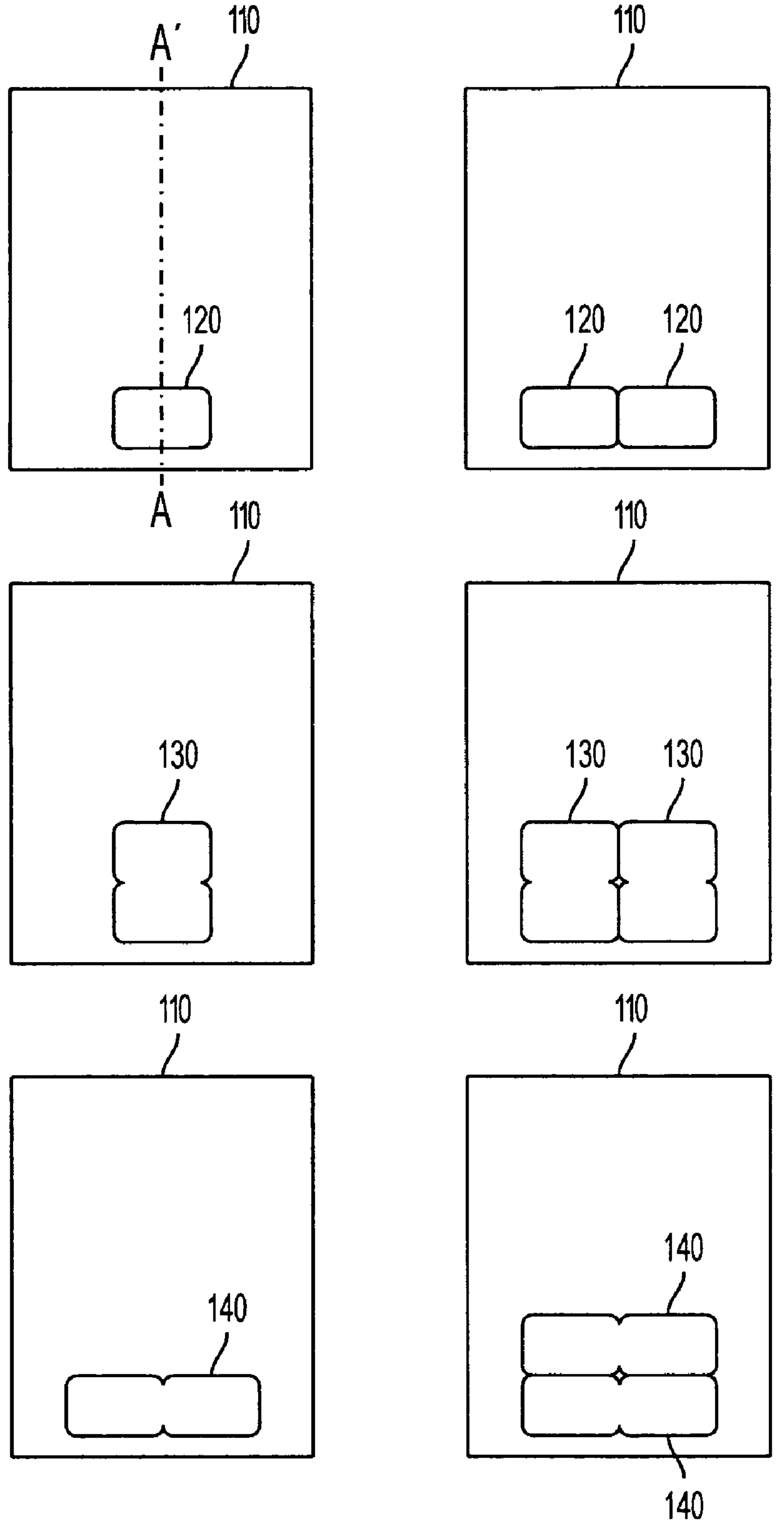
FIG. 1 shows exemplary configurations of multi-thickness media in plan view.

FIG. 1 shows some exemplary configurations of the above-described combined, multi-thickness media. The media may include a standard-sized large sheet of media 110 (hereinafter the "large media") and at least one of a small media 120 for single-side printing, a small media 130 which may be folded along a long axis to approximate double-side printing, and/or a small media 140 which may be folded along a short axis to approximate double-side printing.

Figure 2:
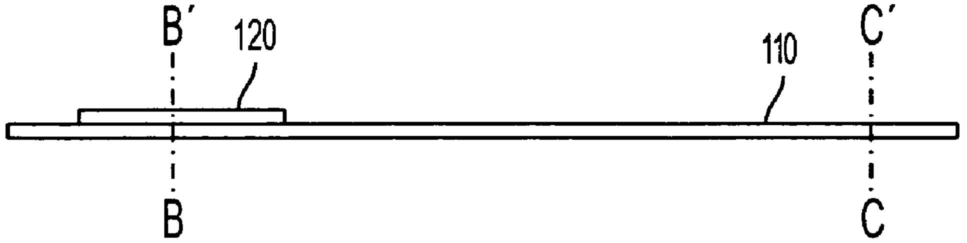
FIG. 2 shows an exemplary configuration of multi-thickness media in cross-section.

FIG. 2 shows an exemplary configuration of multi-thickness media in cross-section. Specifically, FIG. 2 shows a cross-section through line A-A' in FIG. 1, of a combined multi-thickness media including a large sheet of media 110 and a small media 120 for single-side printing. As shown in FIG. 2, the combined multi-thickness media is thicker, in a direction of line B-B', in a portion corresponding to the small media 120. The combined multi-thickness media is thinner, in a direction C-C', in a portion corresponding to only the large media 110.

Figure 3:
FIG. 3 shows a conventional stacking arrangement of multi-thickness media in cross-section.
Figure 4:
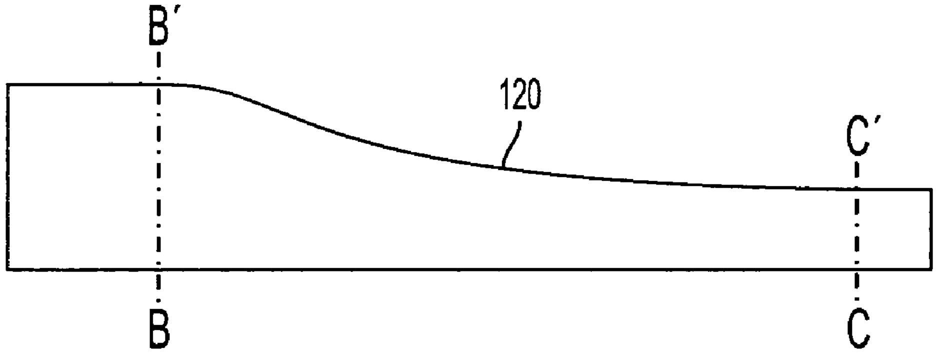
FIG. 4 shows a cross-sectional profile of a conventional stack of a large number of sheets of multi-thickness media.

FIG. 3 shows a plurality of the combined multi-thickness media stacked in a conventional manner. As discussed above, combined multi-thickness media are conventionally stacked in a same orientation in order to simplify the marking process. Thus, as shown in FIG. 3, each sheet is aligned in a stack with a portion corresponding to the small media 120 stacked above a portion corresponding to the small media 120 of the sheet below it. The thicker portion of each sheet is stacked on a thicker portion of each sheet below it. Thus, a portion of the entire stack corresponding to the small media 120 (e.g., the vicinity of line B-B') is substantially thicker than a portion corresponding to only the large media 110 (e.g., in the vicinity of line C-C'). An example of the resultant shape of a large stack of combined multi-thickness media is shown in FIG. 4.

The difference in thickness between a portion of the stack corresponding to the small media 120 and a portion corresponding only to the large media 110 can cause a number of problems when attempting to load a plurality of sheets into a marking device. For example, by virtue of the slope created by the difference in thickness, sheets on the top of the stack have a tendency to slide off the top of the stack. Additionally, by virtue of the slope created by the difference in thickness, sheets on the thicker end of the stack have a tendency to separate, or fan out, as a result of the slope and the stiffness of the media.

The slope and separation of the sheets when stacked in this conventional manner makes it difficult for a conventional media transport system to effectively contact and transport a single sheet of the combined multi-thickness media through the marking device.

Figure 5:
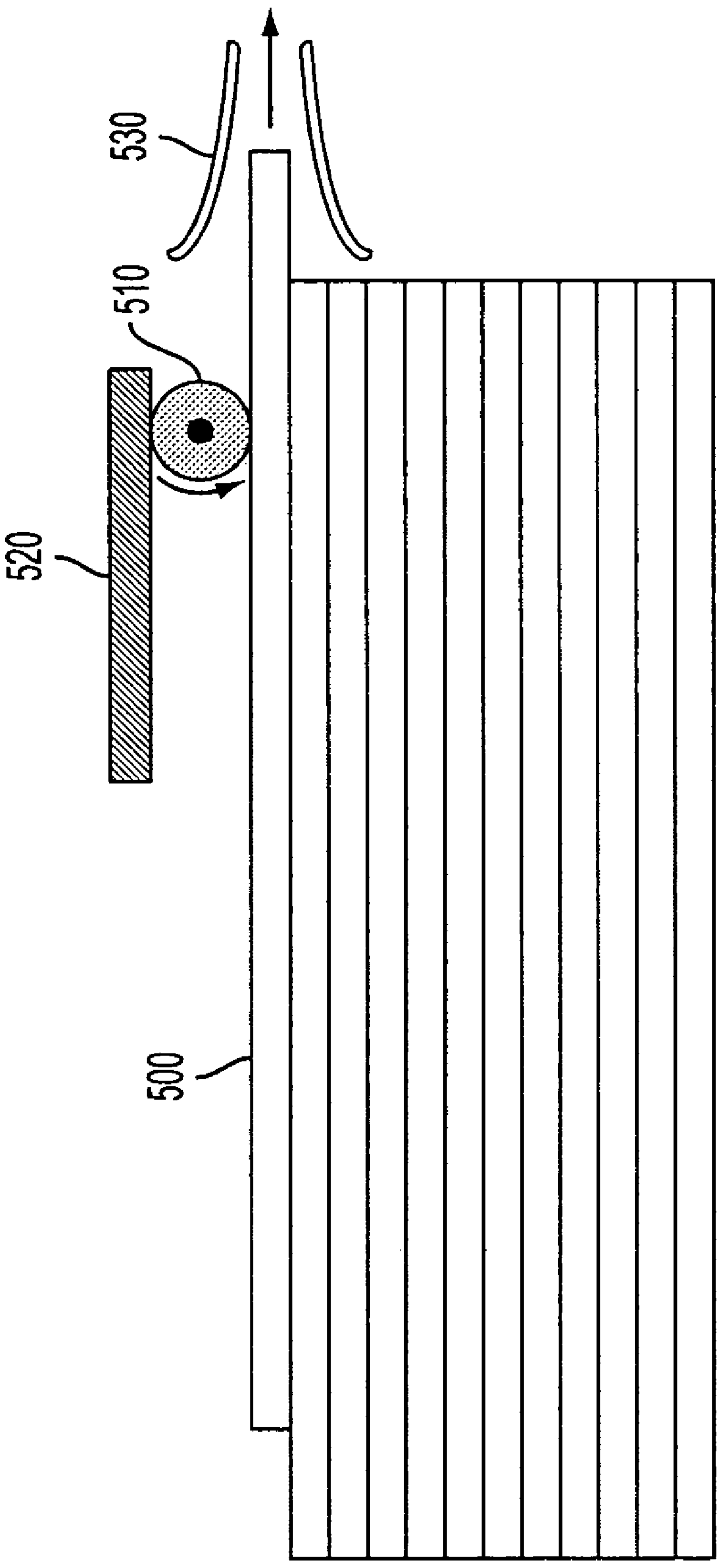
FIG. 5 shows a cross-sectional profile of a conventional stack of sheets of constant thickness media in a feed mechanism.

For example, as shown in FIG. 5, when sheets of constant thickness media 500 are loaded in a feeder, the stack has a substantially constant thickness as well. Thus, when the sheet picker 510 of the feed head 520 pulls a sheet from the stack, a direction of transport of that sheet is properly aligned with the feed chute 530.

Figure 6:
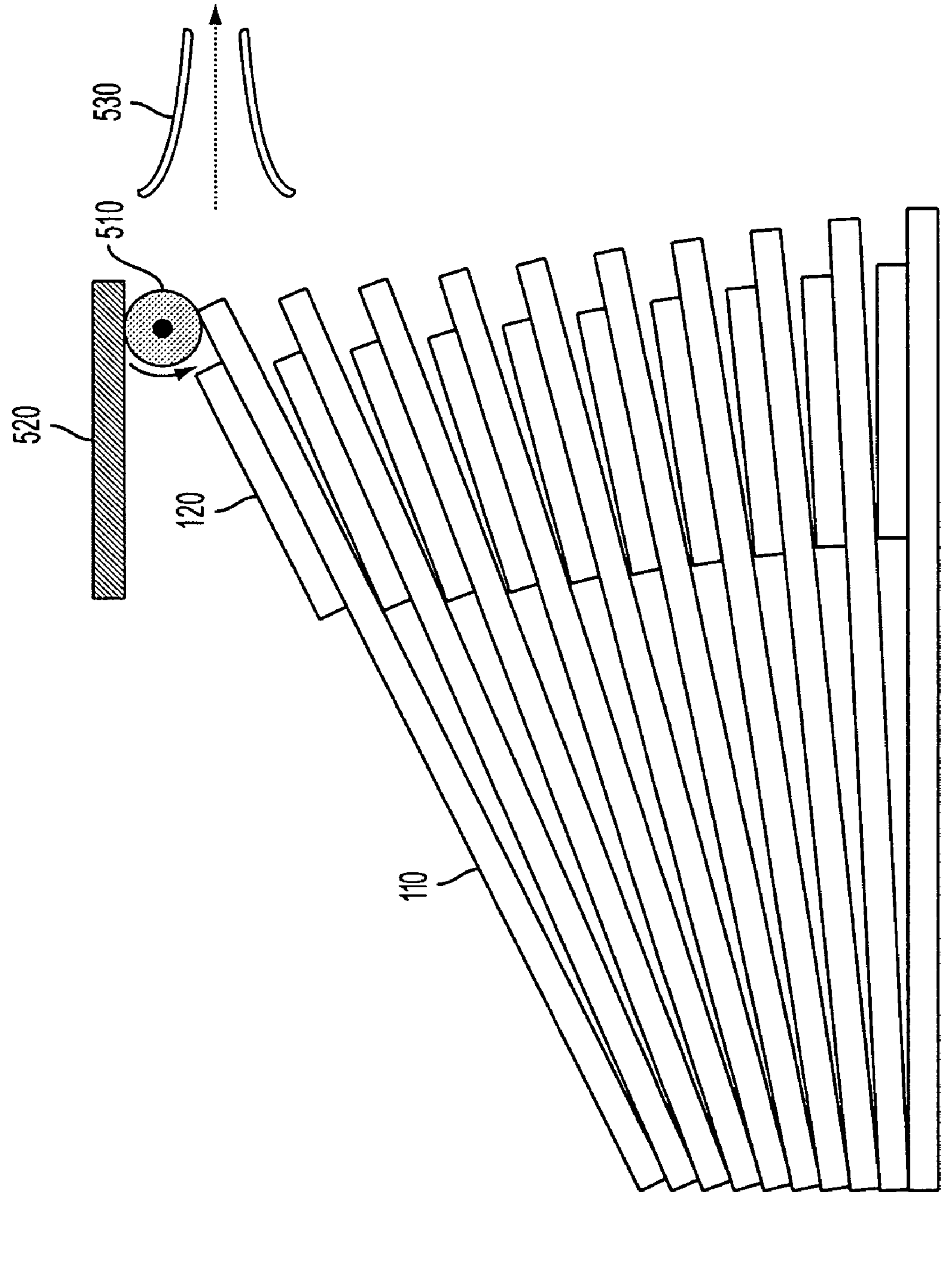
FIG. 6 shows a cross-sectional profile of a conventional stack of sheets of multi-thickness media in a feed mechanism.

However, as shown in FIG. 6, when sheets of multi-thickness media, including, for example, large media portion 110 and small media portion 120, are loaded in a feeder stack in a conventional manner, the difference in thickness between a portion of the stack corresponding to the small media 120 and a portion of the stack corresponding to only the large media 110 causes the stack to slope away from the sheet picker 510 and feed head 520. As a result, the leading edges of the sheets are picked by the sheet picker 510 at an angle of incidence substantially corresponding to the slope of the stack. As the height of the stack increases, the angle of incidence increases and thus the greater the separation or fanning of the sheets at their leading edge.

Accordingly, tall stacks, whose sheets are picked at a large angle, may not feed at all (misfeed) if the angle of incidence of the sheet causes the direction of transport of the sheet to miss or otherwise jam in the feed chute 530. Additionally, when the sheet picker 510 applies a rotational to the top sheet and the top sheet is at an angle rather than horizontal, the friction between sheets may cause multiple sheets to be picked simultaneously, resulting in a jam.

In order to reduce the likelihood that a jam or misfeed may result due to the stacking of the combined multi-thickness media, many users of marking devices have reduced the number of combined multi-thickness media that are stacked in the marking device at any one time. This requires a user to more closely monitor the number of combined multi-thickness media in the device and more frequently replenish the combined multi-thickness media or to unload the stacker.

Figure 7:
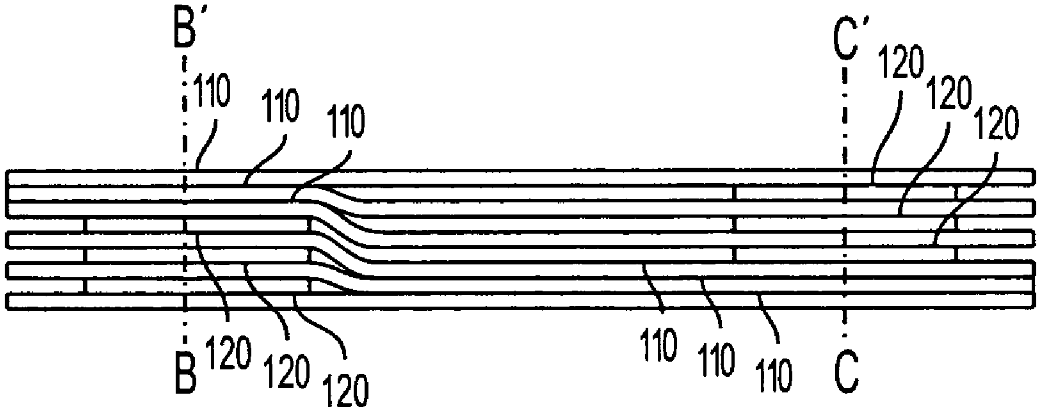
FIG. 7 shows stacked sheets of multi-thickness media in cross-section according to an exemplary implementation of the principles described herein.

Accordingly, it is beneficial to provide systems, methods, and programs that allow for a large number of sheets of combined multi-thickness media to be stacked in the feeder of a general purpose marking device, and for these sheets to be reliably stacked in the stacker after being marked. FIG. 7 shows an example of a method of stacking combined multi-thickness media that substantially reduces the unevenness of the stack. As shown in FIG. 7, a first amount of combined multi-thickness media may be stacked in a same orientation with the thicker portion of each sheet stacked on a thicker portion of each sheet below it. Then, a second amount, for example, having a substantially similar number of sheets as the first portion, may be stacked on the first amount in an orientation such that a thicker portion of the second amount of combined multi-thickness media may be stacked on the thinner portion of the first amount. Additional amounts of combined multi-thickness media may be stacked in the same alternating fashion.

As a result of the configuration shown in FIG. 7, some of the sheets combined multi-thickness media will have the small media 120 in the vicinity of the leading edge of the large media 110 and some of the sheets of combined multi-thickness media will have the small media in a vicinity of the trailing edge of the sheet of media. When taken together, as shown in FIG. 8, a stack including a large number of sheets may have a substantially similar thickness in the vicinity of the small media 120 since the small media is located in both the leading edge and trailing edge portions of the stack.

Figure 9:
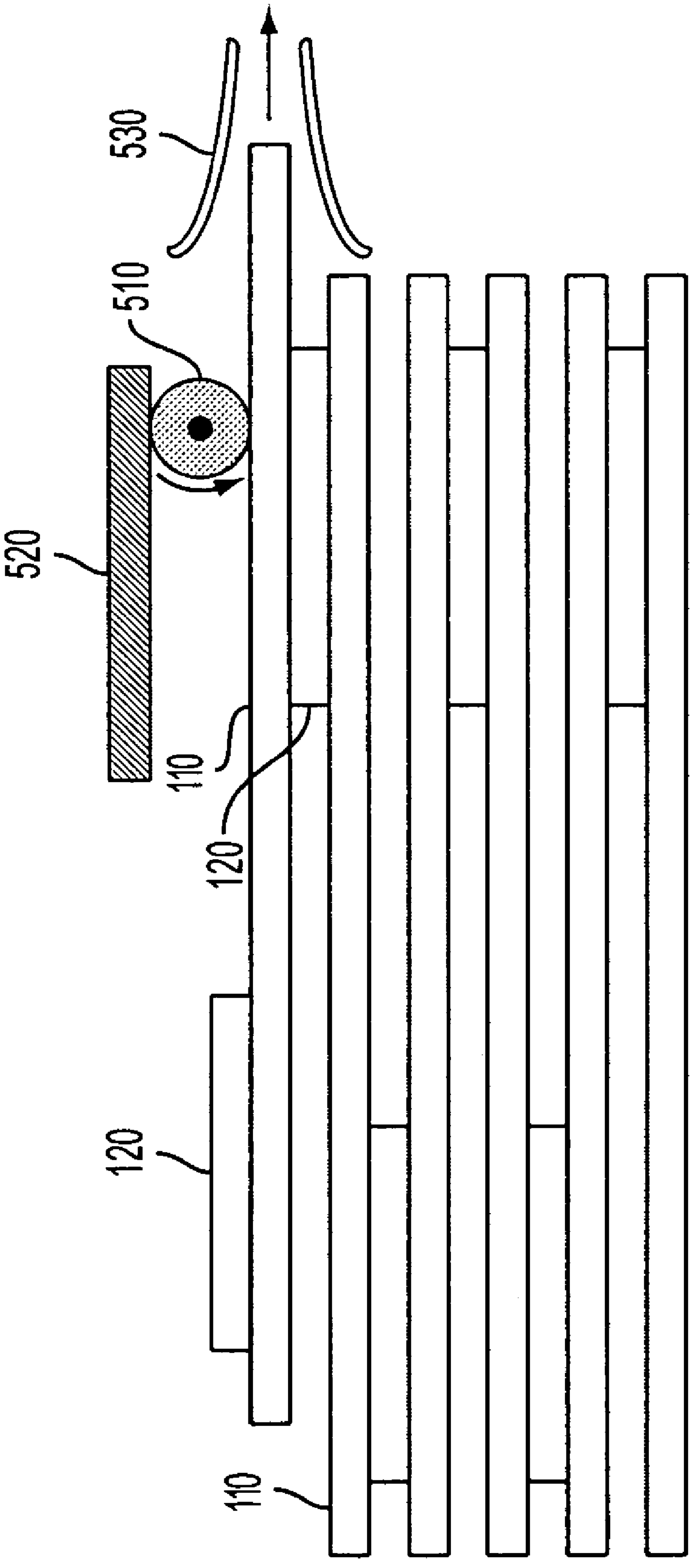
FIG. 9 shows a cross-sectional profile of a stack of sheets of multi-thickness media in a feed mechanism, stacked according to an exemplary implementation of the principles described herein.

By stacking the sheets of combined multi-thickness media in such a manner, the angle of incidence of sheets when picked by the picker 510 is substantially horizontal. As shown in FIG. 9, when sheets of combined multi-thickness media are picked form an alternated stack, the sheet picker 510 of the feed head 520 pulls a sheet from the stack in a direction of transport that is properly aligned with the feed chute 530. Thereby reducing the likelihood of a misfeed and/or jam.

As discussed above, combined multi-thickness media is conventionally stacked in a same orientation (e.g., as shown in FIGS. 3 and 4) in order to simplify the marking process. When conventionally stacked combined multi-thickness media is transported through the marking device, the small media 120 is always in the same location relative to the marking device. As a result, the image device dose not need to adjust the position of the marked image with respect to the sheet of combined multi-thickness media.

Figure 8:
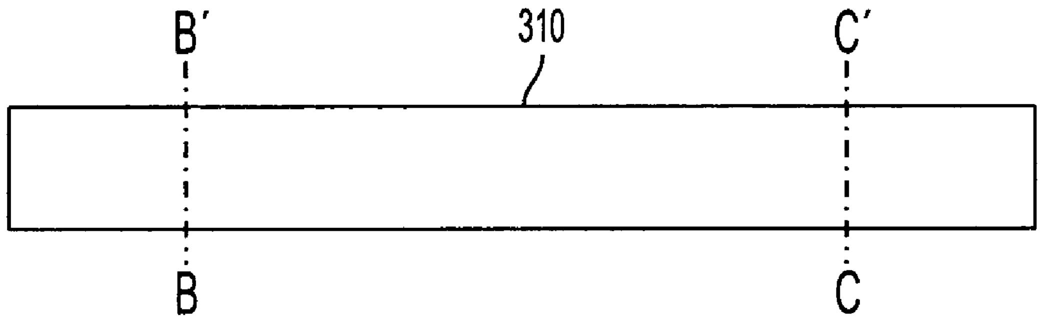
FIG. 8 shows a cross-sectional profile of a stack of a large number of sheets of multi-thickness media according to an exemplary implementation of the principles described herein.

According to the stacking method shown in FIGS. 7-9, the location of the small media 120 relative to the stack is not the same. Similarly, the location of the small media 120 within the marking device will vary depending upon the orientation of the sheet to be marked.

Figure 10:
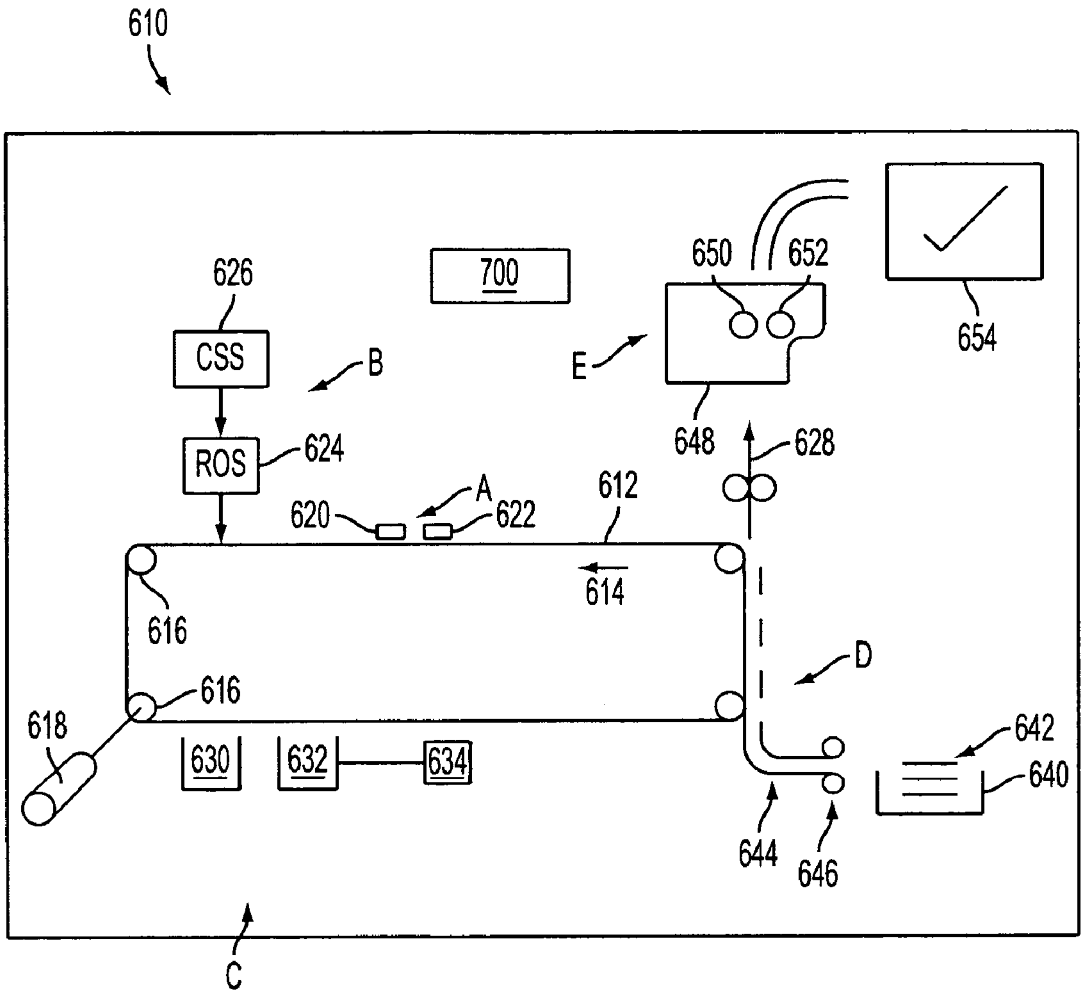
FIG. 10 is a schematic, block diagrammatic view of a reproduction system in accordance with an embodiment of the invention.

A reproduction system 610 in which the present invention finds advantageous use is illustrated in schematic, block diagrammatic view of FIG. 10. With reference now to that FIGURE, a belt 612 having a charge retentive surface moves in the direction of arrow 614 to advance successive portions of the belt sequentially through various processing stations disposed on the path of movement thereof. Although a belt 612 is illustrated, other forms of conveying latent images may be used as well such as, for example, a photoreceptive drum. The belt is carried on rollers 616 and at least one of the rollers is operatively connected with a drive means 618. Portions of the belt 612 pass through a charging station A. At the charging station A, a pair of corona devices 620 and 622 charge successive portions of the photoreceptor belt 612 to a relatively high, substantially uniform negative potential.

At exposure station B, the uniformly charged photoreceptor is exposed to a laser based scanning device 624 or ROS, which, in accordance with a driving CSS 626, selectively discharges portions of the photoreceptor belt to predetermined charge levels in accordance with a stored image. This records an electrostatic latent image on the belt which corresponds to the informational area contained within electronically stored original information. The ROS could be replaced with a conventional electrophotographic exposure arrangement.

A development station C includes a first developer housing 630 and a second developer housing 632 which each include a magnetic brush development system for advancing developer materials into contact with the electrostatic latent image formed on the photoreceptor. Appropriate developer biasing is accomplished via a power supply 634 which is electrically coupled with respective developer housings 630 and 632. A power supply 634 also provides all of the electromotive forces required to operate the subject reproduction system 610.

Sheets 642 of support material are advanced to a transfer station D from one or more supply trays 640, which supply trays may hold different quantities, sizes, and types of support materials. Sheets are advanced to transfer station D along a paper path 644 by rollers 646. After transfer, the sheets continue to move in the direction of arrow 628 which advances each sheet to a fusing station E.

Fusing station E, which includes a fuser assembly, indicated generally by reference numeral 648, serves to permanently affix the transfer toner powder images to the sheets. Preferably, the fuser assembly 648 includes a heated fuser roller 650 adapted to be pressure engaged with a back-up roller 652 with the toner powder image contacting fuser roller 650. In this manner, the toner powder image is permanently affixed to the sheet.

After fusing, copy sheets bearing fused images are directed to an output catch tray 654 or to a finishing station for binding, stapling, collating, etc. and removal from the machine by the operator. Alternatively, the sheets may be advanced to a duplex tray (not shown) from which it will be returned to the processor and conveyor for receiving a second side copy. Each of the subsystems described above is responsive to signals from a controller 700.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

Figure 11:
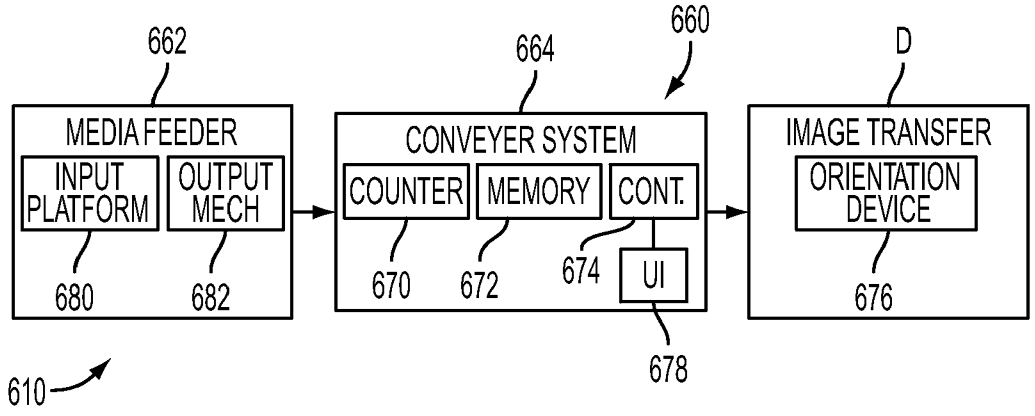
FIG. 11 is a diagrammatical block diagram of a marking system that properly orients an image relative to media having uneven thickness based on part count.

FIG. 11, illustrates a portion of the reproduction system 610 of FIG. 10 in block diagrammatical form to illustrate a first embodiment of the invention that shows a printing system 660 that utilizes a media feeder 662 to output media to a conveyer system 664 which transports the media to an transfer station D. The conveyer system 664 includes a counter 670, a memory 672, a controller 674 and a user interface 678. The transfer station D includes an orientation device 676. The media feeder 662 consists of an input platform 680 and an output mechanism 682. The input platform 680 includes a base platform that has mechanically variable sidewalls to accommodate various sizes of stock. In one embodiment, the media feeder 662 employs a plurality of input platforms 680 that are each configured for a particular media size.

The output mechanism 682 is an apparatus that draws a single piece of media from the input platform 680 and provides it to the conveyer system 664. Rollers or other means can be employed to draw the media from the input platform to accommodate various media thicknesses. The location of the output mechanism 682 can vary in relation to the location of the input platform 680. In one example, the output mechanism can be lowered continuously as media is drawn from the input platform 680. In another example, the input platform 680 can be raised on a periodic or continuous basis as media is drawn by the output mechanism 682.

In this embodiment, the media has an asymmetrical thickness and is oriented in an alternating fashion. Asymmetrically thick media has a thick side and a thin side. In one example, the media is oriented such that fifty pieces of media have the thick side oriented to the left followed by fifty pieces oriented to the right and so on. The number of pieces of media is not critical. However, in this embodiment, it is important that the media is stacked in alternating bundles of the same size or sheet count. That is, it is important that the media has the same mount of like-oriented media alternatively stacked in the input platform 680. It is to be appreciated that the media loaded into the input platform is the same media and that the only variable is the orientation of such stock. The alternating configuration of the media is input into the controller 674 within the conveyer system 664.

The conveyer system 664 can consist of a series of belts positioned linearly to provide a path by which to transport the media from the output mechanism 682 to the transfer station D. In addition or alternatively, other various mechanical configurations can be utilized to move the media from the output mechanism 682 to the transfer station D.

The counter 670 is a device that detects when a single piece of media is introduced to the conveyer system 664. The counter 670 can employ any number of technologies now known or developed hereinafter to detect stock. In addition, once the counter 670 determines that a piece of media has been introduced, a signal is output. In one preferred example, the counter is a light switch wherein an optical beam is sent from a transmitter to a receiver. When a piece of media is introduced between a light emitter and receiver pair, the beam is broken and a suitably conditioned signal is output. The signal can be substantially any type of analog or digital signal.

In another example, the counter 670 is a displacement sensor. In this embodiment, an optical beam is directed toward a predetermined location on the conveyer system. The beam is reflected off of this location and returned to a receiving element within the displacement sensor. When a piece of media is introduced to the sensor, the reflected beam is returned in a disparate location and a signal is output that relates to the presence of the stock.

The counter 670 transmits a signal to the memory 672 every time a piece of media is detected. The memory 672 can be any solid state device such as EPROM, EEPROM, RAM, flash memory or the like. The memory 672 is employed to provide a running count of the number of signals transmitted from the counter 670.

The memory 672 interfaces with the controller 674. The controller 674 is employed to monitor the memory 672 and to output a signal to the orientation device 676. In addition, the controller can be employed to reset the memory 672 between print jobs. A user interface 678 is coupled to the controller 674 to input media orientation information to the printing system 660. Such information can include the amount of media (e.g., 50 pieces, 100 pieces, etc.) alternatively oriented in the input platform 680. In addition, a user can utilize the user interface to signal when a new batch of media is loaded into the printing system 660. The controller 674 can receive such information from the user interface 678 to determine when to appropriately trigger the orientation device 676.

The orientation device 676 receives information from the controller 674 indicative of when the orientation of the media has changed. In one example, media is alternatively configured such that every fifty pieces of media is oriented 180 degrees from each other. This information is a priori and the printing system 660 is dependent on such configuration since the counter simply indicates when a piece of media has been introduced (e.g., not the orientation of the stock). Thus, after fifty pieces have passed by the counter, the transfer station D adjusts and prints the next fifty images 180 degrees from the image placed on the first fifty pieces and so on.

The orientation device 676 is a control element employed to accept a signal from the controller and to trigger an alternative imaging configuration within the transfer station D. The orientation device 676 can be employed to locate the image in a desired location on the stock. In one embodiment, a WYSIWYG software interface is utilized to allow a user to place the image in any location on the stock. For example, the image is located in 180 degrees perpendicular to the direction the media is fed into the printing system 660. By way of further example, the image is placed 180 degrees parallel to the direction the media is fed into the printing system. Thus, the orientation device 676 not only triggers the imaging system but tells the imaging system where to place a desired image on the stock.

In one embodiment, the transfer station D orients a desired image 180 degrees from a previous configuration. In this manner, the orientation of the image is alternated periodically as the asymmetric media is fed through the printing system 660. In another example, the media contains two cards on one side of the media and nothing on the other side. Thus, when triggered by the orientation device 676, the transfer station D places an image on the card side of the stock. The transfer station D can include any number of known printing technologies employed to place an image on the stock.

Figure 12:
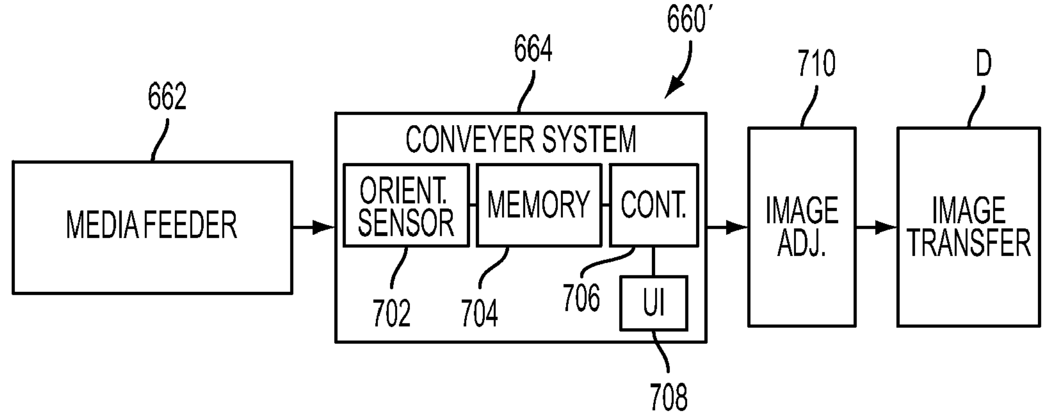
FIG. 12 is a diagrammatical block diagram of a printing system that orients an image on media based on an orientation of the media having uneven thickness.

Turning next to FIG. 12, illustrated is a printing system 660' which includes the media feeder 662, the conveyer system 664 and the transfer station D, as noted above. Unlike the embodiment described in FIG. 11, this configuration does not rely upon a priori knowledge of the orientation of the media loaded into the media feeder 662. Instead, the printing system 660' utilizes information provided by an orientation sensor 702 to determine the orientation of the images placed on the stock. The orientation sensor 702 is coupled to the conveyer system 664 which further includes a memory 704 and a controller 706. A user interface 708 is coupled to the controller 706 to allow programming of the controller 706. An image adjustment system 710 receives information from the controller 706 and interfaces with the transfer station D.

The orientation sensor 702 is employed to determine the orientation of the media as it moves within the conveyer system 664. It is to be appreciated that the media has an asymmetrical thickness that can be detected by the orientation sensor 702. In one embodiment, the orientation sensor 702 utilizes an optical ribbon of light transmitted from a transmitting element to a receiving element. The orientation sensor 702 can determine if the thick side of the media is leading or trailing as the media is fed through the printing system 660. In one approach, such a determination can be made based on the amount of light blocked at the receiving element of the orientation sensor 702.

A memory 704 is employed to compile the orientation information from the orientation sensor 702. A controller 706 is employed to monitor the memory and provide an output based at least in part upon information provide via the user interface 708. An image adjustment system 710 transmits the location and/or orientation of the image to be placed on the media by the transfer station D. The image adjustment system 710 utilizes information provided by the orientation sensor 702 to adjust the image printed on the media by the transfer station D. In this manner, the location and/or orientation of the image placed on the media can be automatically changed regardless of the configuration of the media within the media feeder 662.

Figure 13:
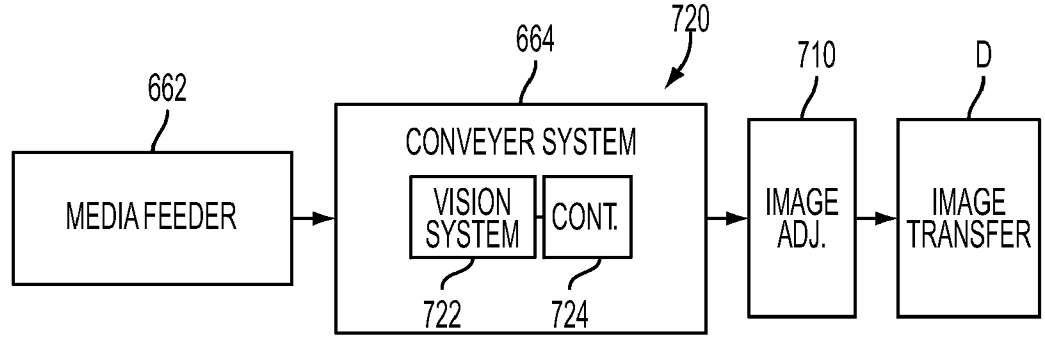
FIG. 13 is a diagrammatical block diagram of a printing system in accordance with a further embodiment which orients an image on print media based on vision system information.

Turning next to FIG. 13, depicted is a printing system 720 which includes the media feeder 662, the conveyer system 664, the transfer station D and the image adjustment system 710. In this embodiment, a vision system 722 is employed with the conveyer system 664. The vision system can utilize color or gray scale pixilation to determine the two dimensional (e.g., X and Y axis) location of a piece of media within the conveyer at a particular point in time. The vision system 722 can be triggered via an outside sensor (not shown) or when the media has been introduced into the vision system's field of view at a predetermined location.

The vision system 722 can be located above the conveyer system such that the field of view includes an entire piece of stock. In another approach, the field of view can include an edge (e.g., leading or trailing) of the media such that the orientation of the media can be determined based at least in part on the location of the vision system, the size of the field of view and the size of the media employed.

The vision system 722 can be programmed to output a signal when a particular orientation is detected. A plurality of configurations can be stored within a vision system memory (not shown) to accommodate several media sizes at the same time. A controller 724 is coupled to the vision system 722 to accept information from the vision system 722. Such information can include not only the orientation of the incoming media but can also indicate if there is any offset in the location of the media along the conveyer system. In one example, the media can be rotated on the conveyer system 664 by fifteen degrees. The image adjustment system 710 can direct the transfer station D to rotate the image fifteen degrees to accommodate the skew of the media incoming to the transfer station D. Thus, the vision system 722 provides additional information related to the actual orientation of each piece of media presented to the transfer station D. This information is in addition simply making a determination as to the orientation (leading or trailing) of the media as illustrated in FIG. 12.

Figure 14:
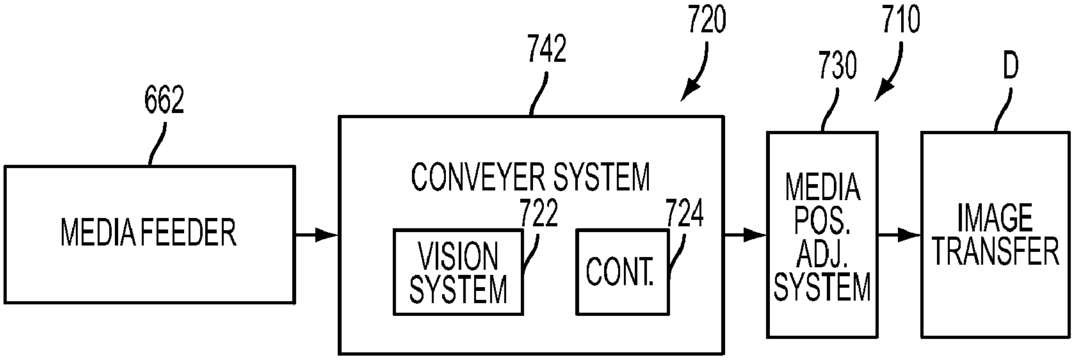
FIG. 14 is diagrammatical block diagram of a printing system that orients an image on media by modifying the position of the media relative to the printing system.

Turning next to FIG. 14, shown is the printing system 720 from FIG. 13 above. However, the printing system 720 employs a media position adjustment system 730 in place of the image adjustment system 710 to properly orient media when introduced to the transfer station D. The media position adjustment system 730 employs positioning elements (not shown) and one or more feedback position sensors (not shown) to insure the leading edge of the media is in the same location relative to a predetermined datum. In this manner, the transfer station D places the image in the same location every time. Thus, the transfer station D relies on the location of the media as oriented by the media position adjustment system 730.

Figure 15:
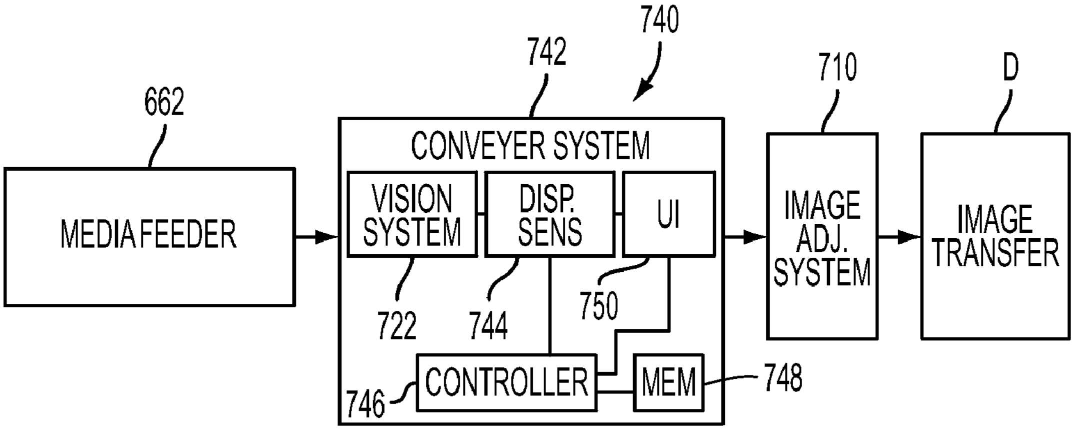
FIG. 15 is a diagrammatical block diagram of a printing system that orients an image on media in response to 3-dimensional feedback; and, FIG. 16 is a diagrammatical block diagram illustrating a printing system that places images on media based on information stored in a program bank.

Turning to FIG. 15, a printing system 740 includes a media feeder 662, a transfer station D, an imaging adjustment system 710 and a conveyer system 742. The conveyer system 742 further includes the vision system 722 and a displacement sensor 744. As noted above, the vision system 722 determines the location of the media in the "X" and "Y" direction. The displacement sensor 744 determines the "Z" location (e.g., thickness) of the stock. An optical beam of light is emitted onto the surface of the media to determine the thickness of the media as it is introduced and an analog signal is output that represents the thickness of the stock.

A controller 746 interfaces with both the vision system 722 and the displacement sensor 744 to determine the location and orientation of the media in three dimensions. This information is transmitted to a memory 748 that can store a plurality of configuration and/or orientation data. This information can be trended to identify particular printing system 740 conditions such as mechanical wear to provide predictive maintenance to the printing system 660.

A user interface 750 allows the memory to be accessed and organized. In addition, the user interface 750 allows the controller 746 to be configured to set one or more predetermined thresholds and to provide an output when one or more such thresholds is broken. In one example, the controller 746 keeps a running count of the total amount of media sent to the transfer station D. The controller 746 can alert an operator that the media level is low and needs to be replenished.

The controller 746 interfaces with the imaging adjustment system 710. The imaging adjustment system 710 can utilize software to modify the location and/or orientation of an image placed on the stock. Such configuration is transmitted to the transfer station D to place the image onto the stock. In this manner, the location and/or orientation of the image can vary from piece to piece of stock.

Figure 16:
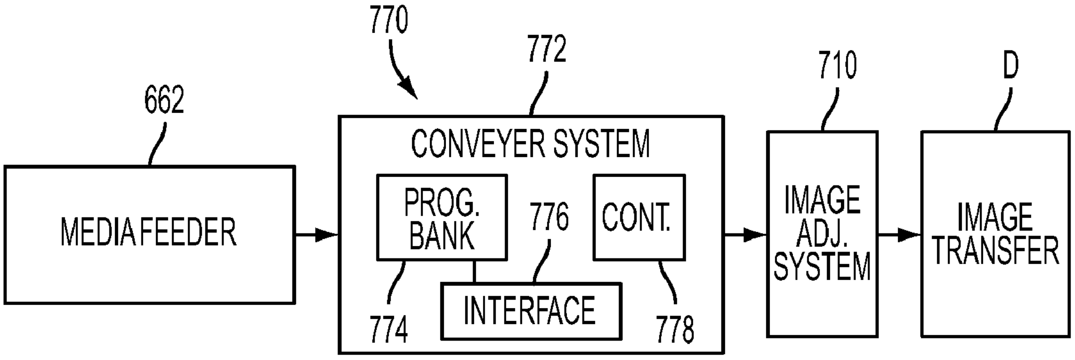

Turning lastly to FIG. 16, a printing system 770 is shown including the media feeder 662, the image adjustment system 710, the transfer station D and a conveyer system 772. The conveyer system 772 includes a program bank 774, an interface 776 and a controller 778. The program bank 774 contains a list of various media sizes and/or thicknesses that are employed with the printing system 770. Additionally, the program bank 774 can store the orientation configuration corresponding to each media size.

The interface 776 is coupled to the program bank to allow a user to add, edit and delete existing program configurations. The interface 776 can provide an intuitive resource for information in the program bank 774 to be stored and utilized by the printing system 770. The controller 778 is coupled to the program bank 774 to provide program information to the transfer station D. In this manner, the printing system 770 can be preconfigured to print batches of various media size and thickness.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

For example, while the exemplary methods and systems described herein are described within the context of combined multi-thickness media, the methods and systems are applicable to any media that has a thickness variation between its leading edge portion and its trailing edge portion.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

The invention claimed is:

1. A printing system comprising:

a media feeder including a supply tray adapted to store a plurality of asymmetrically thick media sheets in a stack, wherein a first sheet of the asymmetrically thick media sheets is oriented different than a second sheet of the asymmetrically thick media sheets, and a device system adapted to remove said asymmetrically thick media sheets from the stack and move the sheets along a transport path, wherein the different orientations substantially reduce the unevenness of the stack by having a thicker end of the first sheet stacked on a thinner portion of the second sheet;

a sensor disposed along said transport path to determine the presence of the asymmetrically thick media sheet;

an orientation sensor adapted to detect by a one of a transmissive sensing, a reflective sensing, and a thickness sensing whether the leading edge of the asymmetrically thick media sheet is a thick edge or a thin edge compared to the trailing edge to determine the orientation of the asymmetrically thick media sheet;

a vision system adapted to visually determine the location of the asymmetrically thick media sheet in the conveyer system, including any offset, or skew of fifteen degrees, in the location of the asymmetrically thick media sheet along the conveyor system;

a controller coupled to the media feeder, sensor, orientation sensor and vision system for generating image placement information specifying a desired location and a desired orientation of an image on the asymmetrically thick media sheets, wherein the image placement information is based at least in part on information from the sensor, orientation sensor and vision system;

an image or media adjustment system adapted to generate data to adjust the image or asymmetrically thick media sheet by fifteen degrees to accommodate skew of the asymmetrically thick media sheet and, an image transfer system that receives the asymmetrically thick media sheets from the media feeder and places the image on the asymmetrically thick media sheet in the proper location and orientation based at least in part on information from the controller and the image or media adjustment system.

2. The printing system according to claim 1, further including:

a memory coupled to the controller that cumulatively stores and transmits the total number of pieces of asymmetrically thick media sheet transported by the conveyer system to the controller throughout the operational lifetime of the system.

3. The printing system according to claim 1, further including:

an orientation device that triggers the imaging system based at least in part on an input from the controller, the orientation device directs the orientation of the image placed by the imaging system.

4. The printing system according to claim 1, further including: a user interface that allows a user to set when image orientation should be changed based at least in part on the orientation of the asymmetrically thick media sheet in the media feeder.

5. The printing system according to claim 1, wherein the imaging system changes the orientation of the image one hundred and eighty degrees based at least in part upon information received from the controller.

6. The printing system according to claim 1,:

wherein the sensor disposed along said transport path is a counting sensor that outputs a signal to indicate that a piece of media has been introduced.

7. The printing system according to claim 1, further including:

wherein the a displacement sensor determines the thickness of the asymmetrically thick media sheet wherein the thickness information is output to the controller.

8. The printing system according to claim 1, further including:

a program bank that stores at least one program that includes the orientation of the stock, the size and thickness of the asymmetrically thick media sheet and the location of the image on the asymmetrically thick media sheet.

9. The printing system according to claim 1, wherein the asymmetrically thick media sheet is a piece of paper with two corrugated paper cards adhered to one side of the piece of paper.

10. The printing system according to claim 1, wherein the asymmetrically thick media sheet is one of paper, acetate, corrugated paper and plastic.

11. A method of orienting an image on a piece of media, comprising:

stacking a plurality of individual asymmetrically thick media sheets that contains a thick side and a thin side in an alternating manner such that the thick side is oriented equally on both sides of the stack to substantially reduce the unevenness of the stack;

transporting the asymmetrically thick media sheet from a media feeder to an imaging system along a paper path using a conveyer system;

sensing the presence of the asymmetrically thick media sheets as the asymmetrically thick media sheets are transported from the media feeder to the imaging system;

utilizing a vision system to detect the orientation and location of the asymmetrically thick media sheets as they are transported from the media feeder to the imaging system, wherein orientation sensing by the vision system is adapted to detect by one of a transmissive sensing, a reflective sensing, and a thickness sensing whether the leading edge of the asymmetrically thick media sheet is a thick edge or a thin edge compared to the trailing edge to determine the orientation of the asymmetrically thick media sheet relative to said paper path and location sensing by the vision system includes determining a skew of fifteen degrees of the asymmetrically thick media sheets;

determining the location and orientation of an image on the asymmetrically thick media sheets utilizing a controller; and using an image transfer system, printing an image on the asymmetrically thick media sheets via an imaging system based at least in part upon the determined location, orientation and skew.

12. The method according to claim 11, further including:

detecting and storing the total number of pieces of the asymmetrically thick media sheet transported by the conveyer system to the controller throughout the operational lifetime of the conveyer system.

13. The method according to claim 11, further including:

triggering the image transfer system based at least in part on an input from the controller, the orientation device directs the orientation of the image placed by the imaging system.

14. The method according to claim 11, further including:

setting a threshold to indicate when image orientation should be changed based at least in part on the orientation of the asymmetrically thick media sheet in the media feeder.

15. The method according to claim 11, further including:

outputting a signal that indicates a predetermined number of pieces of asymmetrically thick media sheets have been sensed to change the orientation of the image printed on the asymmetrically thick media sheets.

16. The method according to claim 11, further including:

sensing the thickness of the asymmetrically thick media sheet as it is transported from the from the media feeder to an imaging system wherein the thickness information is output to the controller.

17. The method according to claim 11, further including:

storing the orientation of the asymmetrically thick media sheet, the size and thickness of the asymmetrically thick media sheet and the location of the image on the asymmetrically thick media sheet into a memory for subsequent retrieval.

18. A printing system, comprising:

a media feeder that receives and stores asymmetrically thick media from an outside source and outputs such asymmetrically thick media to the printing system via a feed mechanism, wherein a first sheet of the asymmetrically thick media is oriented different than a second sheet of the asymmetrically thick media, wherein the different orientations substantially reduce the unevenness of the stack by having a thicker end of the first sheet stacked on a thinner portion of the second sheet;

a conveyer system that transports the asymmetrically thick media from the media feeder;

a vision system adapted to visually determine the location of the asymmetrically thick media in the conveyer system, the vision system including an image or media adjustment system that determines if the location of the asymmetrically thick media is skewed by fifteen degrees and an orientation sensing system adapted to detect by one of a transmissive sensing, a reflective sensing, and a thickness sensing whether the leading edge of the asymmetrically thick media sheet is a thick edge or a thin edge compared to the trailing edge to determine the orientation of the asymmetrically thick media sheet;

an information store storing orientation information from the orientation sensing system and location information, including skew information, from the image or media adjustment system indicating an orientation and location, including skew, of a current asymmetrically thick piece of stock relative to a portion of the printing system;

a controller coupled to the conveyer that determines the location and orientation of an image on a piece of the asymmetrically thick stock based at least in part on said orientation information and location information, including skew information, from the information store; and an imaging system that receives the asymmetrically thick media from the conveyer system and places an image on the asymmetrically thick media in a desired location and orientation based at least in part on said orientation information and the location information, including the skew information, from the controller.

19. The printing system according to claim 18, further including: an operator interface adapted to receive said orientation information into the system for storage in the information store.

* * * * *